United States Patent
Aggarwal et al.

(10) Patent No.: US 12,155,878 B2
(45) Date of Patent: Nov. 26, 2024

(54) DEMOGRAPHIC PREDICTIONS FOR CONTENT ITEMS

(71) Applicant: ROKU, INC., San Jose, CA (US)

(72) Inventors: Pulkit Aggarwal, San Jose, CA (US); Abhishek Bambha, Burlimgame, CA (US); Rohit Mahto, San Jose, CA (US); Nam Vo, San Jose, CA (US); Fei Xiao, San Jose, CA (US)

(73) Assignee: ROKU, INC., San Jose, CA (US)

( * ) Notice: Subject to any disclaimer, the term of this patent is extended or adjusted under 35 U.S.C. 154(b) by 74 days.

(21) Appl. No.: 18/076,955

(22) Filed: Dec. 7, 2022

(65) Prior Publication Data

US 2024/0205479 A1 Jun. 20, 2024

(51) Int. Cl.
 *H04N 21/25* (2011.01)
 *H04N 21/258* (2011.01)
 *H04N 21/466* (2011.01)

(52) U.S. Cl.
 CPC ..... *H04N 21/251* (2013.01); *H04N 21/25883* (2013.01)

(58) Field of Classification Search
 None
 See application file for complete search history.

(56) References Cited

U.S. PATENT DOCUMENTS

| | | | |
|---|---|---|---|
| 11,686,805 B1 * | 6/2023 | Kratz | G01S 5/0215 |
| | | | 342/451 |
| 2009/0125620 A1 * | 5/2009 | Klincewicz | H04L 41/0813 |
| | | | 709/223 |
| 2024/0134907 A1 * | 4/2024 | Hristova | G06F 16/683 |

* cited by examiner

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments, and/or combinations and sub-combinations thereof, for demographic predictions for content items. An example embodiment operates by assigning weights representing demographics to a first plurality of nodes of a predictive model and assigning predictive values representing predicted demographics to a second plurality of nodes of the model. Pairwise distances between the predictive values for the nodes of the second plurality of nodes and the weighted values of the first plurality of nodes may be calculated and the shortest calculated pairwise distances may be used to assign demographics for content items corresponding to nodes of the first plurality of nodes to content items corresponding nodes of the second plurality of nodes. When content is requested, a content item for which the same demographic has been assigned may be recommended to the requestor.

20 Claims, 4 Drawing Sheets

DEMOGRAPHIC PREDICTIONS FOR CONTENT ITEMS

BACKGROUND

Field

This disclosure is generally directed to content management, and more particularly to forecasting demographics for content items.

Background

Content distribution systems/devices/entities, content management systems/devices/entities, content access systems/devices/entities, map demographic information identified for users, viewers, content consumers, and/or the like that express an affinity for content items to the content items. The mapping is then used to recommend similar content items to the users, viewers, content consumers, and/or the like according to their identified demographics. However, demographic information identified for users, viewers, content consumers, and/or the like is often inaccurate, causing the mappings used to recommend similar content items to the users, viewers, content consumers, and/or the like according to their identified demographics to be inaccurate. Users, viewers, content consumers, and/or the like are routinely recommended content items that bear no semblance to content items for which they have an affinity. Not only is identifying accurate demographic information critical for content recommendation, but content acquisition and ad targeting also rely on accurate identification of content item-related demographics for acquiring content relevant to users, viewers, content consumers, and/or the like, and targeting ads to the same, respectively.

SUMMARY

Provided herein are system, apparatus, article of manufacture, method and/or computer program product embodiments, and/or combinations and sub-combinations thereof, for demographic predictions for content items. According to some aspects of this disclosure, a computing system may use a predictive model to analyze attributes (e.g., actors, objects depicted, video/display-related aspects, audio-related aspects, etc.) of content items and provide an accurate prediction of demographics for an audience of the content items based on the analysis.

According to some aspects of this disclosure, the predictive model may include a unique model implementing iterative k-nearest neighbors (kNN) techniques and/or the like. For example, demographic descriptors (e.g., age, gender, sexual orientation, etc.) of the audience (e.g., users, viewers, content consumers, etc.) of a first set of content items may be given a value (e.g., age=30 yrs old, etc.) that is multiplied by a weight (e.g., to avoid biases). With demographic descriptors applied to the first set of content items, accurate demographic descriptors for new sets of content items can be derived by the predictive model based on similarity metrics with unbiased embedding. Particularly, to assign demographic descriptors to new sets of content items, the most similar content item of the first plurality of content items to each content item of the new sets of content items may be identified based on iteratively computing and comparing similarities between each content item of the new sets of content items to each content item of the first set of content items, and assigning the demographic descriptor for the most similar content item of the first plurality of content items to each content item of the new sets of content items may be identified. Computing the similarities (e.g., multiplied by the associated weights for each measurement) may be based on techniques, including, but not limited to, Euclidean distance calculations, Chebyshev distance calculations, cosine similarity calculations, Manhattan distance calculations, and/or the like.

According to some aspects of this disclosure, a computing system may assign weights representing demographics to a first plurality of nodes of a predictive model and assign predictive values representing predicted demographics to a second plurality of nodes of the model. Pairwise distances between the predictive values for the nodes of the second plurality of nodes and the weighted values of the first plurality of nodes may be calculated and the shortest calculated pairwise distances may be used to assign demographics for content items corresponding to nodes of the first plurality of nodes to content items corresponding nodes of the second plurality of nodes. When content is requested, a content item for which the same demographic has been assigned may be recommended to the requestor.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for demographic predictions for content items.

Figure 1:
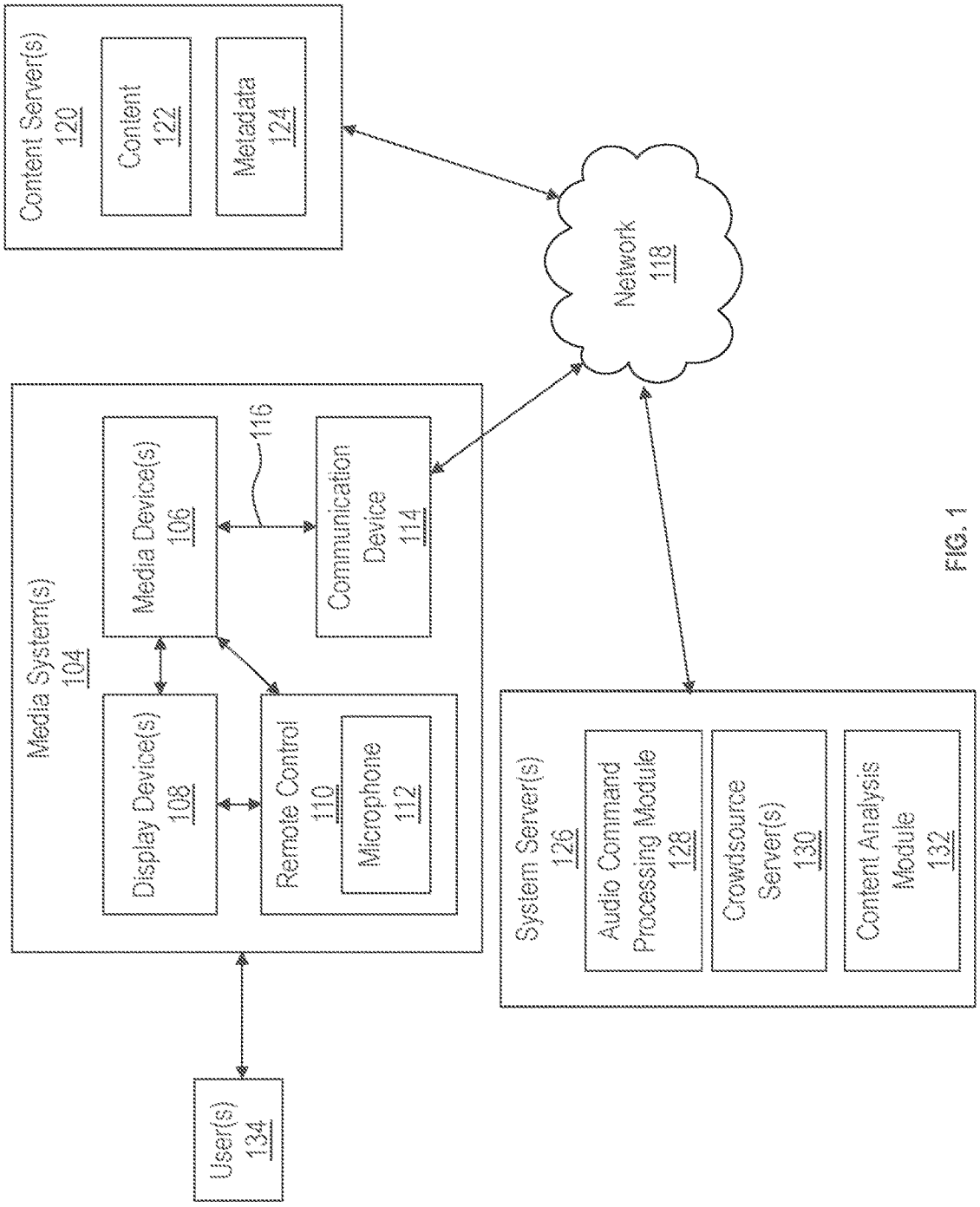
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 134 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Figure 2:
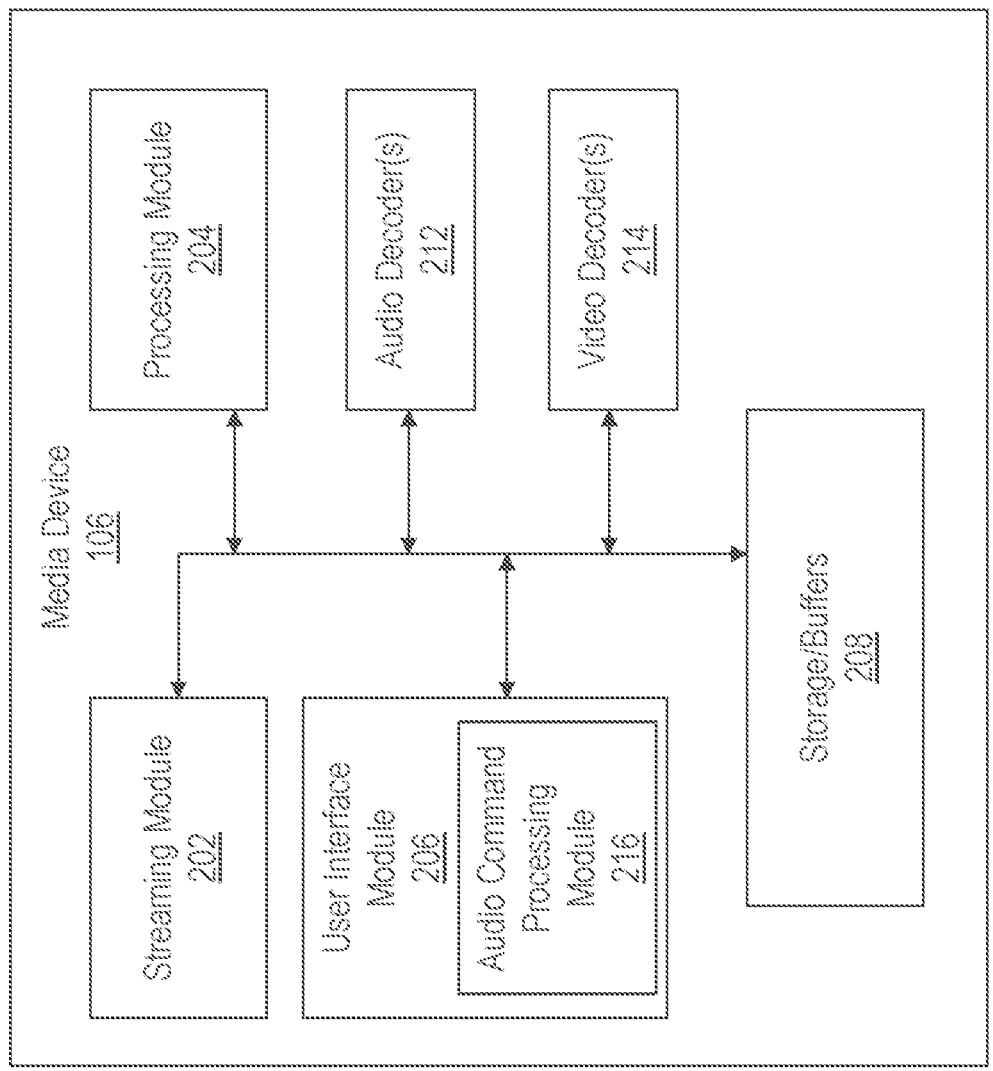
FIG. 2 illustrates a block diagram of a streaming media device, according to some embodiments.

FIG. 2 illustrates a block diagram of an example media device 106, according to some embodiments. Media device 106 may include a streaming module 202, processing module 204, storage/buffers 208, and user interface module 206. The user interface module 206 may include an audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov, etc.), 3GP (3gp, 3gp2, 3g2, 3gpp, 3gpp2, etc.), OGG (ogg, oga, ogv, ogx, etc.), WMV (wmv, wma, asf, etc.), WEBM, FLV, AVI, AVI, VC-1, HEVC (H.265, etc.), QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

According to some aspects of this disclosure, the network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

Media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of content items, music, videos, movies, TV programs, multimedia, images, still pictures, text, graphics, gaming applications, advertisements, programming content, public service content, government content, local community content, software, and/or any other content and/or data objects in electronic form.

According to some aspects of this disclosure, metadata 124 comprises data about content 122. For example, metadata 124 may include associated or ancillary information indicating or related to writer, director, producer, composer, artist, actor, summary, chapters, production, history, year, trailers, alternate versions, related content, applications, objects depicted in content and/or content items, object types, closed captioning data/information, audio description data/information, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126.

The system server(s) 126 may include an audio command processing module 128. As noted above, the remote control 110 may include a microphone 112. The microphone 112 may receive audio data from users 134 (as well as other sources, such as the display device 108). In some embodiments, the media device 106 may be audio responsive, and the audio data may represent verbal commands from the user 134 to control the media device 106 as well as other components in the media system 104, such as the display device 108.

According to some aspects of this disclosure, the audio data received by the microphone 112 in the remote control 110 is transferred to the media device 106, which is then forwarded to the audio command processing module 128 in the system server(s) 126. The audio command processing module 128 may operate to process and analyze the received audio data to recognize the user 134's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 128 in the system server(s) 126, or the verbal command recognized by the audio command processing module 216 in the media device 106).

Now referring to both FIGS. 1 and 2, according to some aspects of this disclosure, the user 134 may interact with the media device 106 via, for example, the remote control 110. For example, the user 134 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 134.

In streaming embodiments, the streaming module 202 may transmit the content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, the media devices 106 may exist in thousands or millions of media systems 104. Accordingly, the media devices 106 may lend themselves to crowdsourcing embodiments and, thus, the system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between closed captioning requests issued by different users 134 watching a particular movie. Based on such information, the crowdsource server(s) 130 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 130 may operate to cause closed captioning to be automatically turned on and/or off during future streamings of the movie.

According to some aspects of this disclosure, using information received from the media devices 106 in the thousands and millions of media systems 104, the crowdsource server(s) 130 may associate demographic descriptors (e.g., age, gender, sexual orientation, etc.) of the audience (e.g., users, viewers, content consumers, etc.) of content items from the content server(s) 120 and/or the like. As a non-limiting example, when users, viewers, content consumers, and/or the like signup with an entity to receive/access the content items (e.g., via the media devices 106, etc.), demographic descriptors may be extracted/identified from the signup data.

According to some aspects of this disclosure, the crowdsource server(s) 130 may communicate the signup data to a content analysis module 132.

According to some aspects of this disclosure, content analysis module 132 may include one or more predictive models. The content analysis module 132 may include a unique model predictive implementing iterative k-nearest neighbors (kNN) techniques and/or the like. For example, demographic descriptors (e.g., age, gender, sexual orientation, etc.) identified from signup data, labeling, and/or the like for a first set of content items may be given a value (e.g., age=30 yrs. old, etc.) that is multiplied by a weight (to avoid biases). With demographic descriptors applied to the first set of content items, content analysis module 132 may provide accurate demographic descriptors for new sets of content items based on similarity metrics with unbiased embedding.

According to some aspects of this disclosure, content analysis module 132 may implement and/or use other artificial intelligence, machine learning techniques, statistical models, logical processing algorithms, and/or the like to provide accurate demographic descriptors for new sets of content items.

Demographic Predictions for Content Items

Referring to FIG. 1, the media devices 106 may exist in thousands or millions of media systems 104. Accordingly, the media devices 106 may lend themselves to crowdsourcing embodiments. Crowdsourcing may be used to gather data/information (e.g., content/content access-related data/information, user comments/feedback, media device usage time and/or interaction-related data/information, etc.) to target and/or recommend content and/or content items to users of the media devices 106. To optimize targeting and/or recommendation of content and/or content items to users of the media devices 106 understanding the demographics of the content and/or content item audience is crucial. For example, in a household and/or family associated with a media system 104 there may be a primary user associated with an account and/or the like for receiving/consuming content and/or content items via media device 106, but the household and/or family may include different users (e.g., family members) of a media device 106. As a result, demographic data/information associated with the primary user may not reflect the demographics of the actual users. Therefore, conventional systems used to connect users to different content and/or content items often fail to provide accurate recommendations of content and/or content items (e.g., are unable to target the correct audiences, etc.).

Furthermore, optimized content acquisition (e.g., proposals to host content items provided via one or more content server 120, etc.) and/or ad targeting/recommendation to users of the media devices 106 also necessitates an understanding of the demographics of the content and/or content item audience. Particularly, content acquisition and ad targeting also rely on accurate identification of content item-related demographics for acquiring content relevant to users, viewers, content consumers, and/or the like, and targeting ads to the same, respectively. The system, apparatus, article of manufacture, method and/or computer program product embodiments, and/or combinations and sub-combinations thereof, for demographic predictions for content items described herein at least enable an enhanced identification and/or understanding of the demographics for content and/or content item audiences.

According to some aspects of this disclosure, one or more components and/or devices of the system server(s) 126 (e.g., crowdsource server(s) 130, content analysis module 132, etc.) operate to facilitate demographic predictions for content items. According to some aspects of this disclosure, content analysis module 132 may use content similarity to identify content-based demographic information for content items. According to some aspects of this disclosure, content analysis module 132 may then use the identified demographic information to provide content and/or content item recommendations to users and/or user devices (e.g., media devices 106, etc.). An algorithm for content analysis module 132 to utilize content similarity to identify demographic predictions for content items is provided in Algorithm 1 below. According to some aspects, Algorithm 1 is just an example and other algorithms may be used for facilitating demographic predictions for content items.

Algorithm 1

Steps:
1. Initialize content items with unknown demographic descriptors with predicted demographic descriptors.
2. Calculate the pairwise similarity between content items with known demographic descriptors and a content item with an unknown demographic descriptor.
3. For iterate=1 to N (where N=any number of content items with unknown demographic descriptors).
   a. Retrieve the most similar (e.g., the top K) content items identified from pairwise similarities.
   b. Assign, to the content item with an unknown demographic descriptor, the demographic descriptor of the content item with the known demographic descriptor that is the most similar content item based on KNN.
4. Endfor.

According to some aspects of this disclosure, Algorithm 1 may be represented by example formula 1 provided below:

Demographic(content item$_i$) =

$$\frac{(\text{Sum}[k = 1 \text{ to } N][1/\text{distance}(\text{content item\_i, content item\_k}) * \text{Demographic (content item\_k)}])}{(\text{Sum}[k = 1 \text{ to } N][1/\text{distance}(\text{content item\_i, content item\_k})])}$$

According to some aspects of this disclosure, as used in example formula 1, content$_i$ represents content items with unknown demographic descriptors, and content$_k$ represents content items with unknown demographic descriptors. According to some aspects of this disclosure, as described herein, demographic predictions for content items includes, but is not limited to, the example formula. According to some aspects of this disclosure, other formulas and/or algorithms may be used for demographic predictions for content items.

Figure 3:
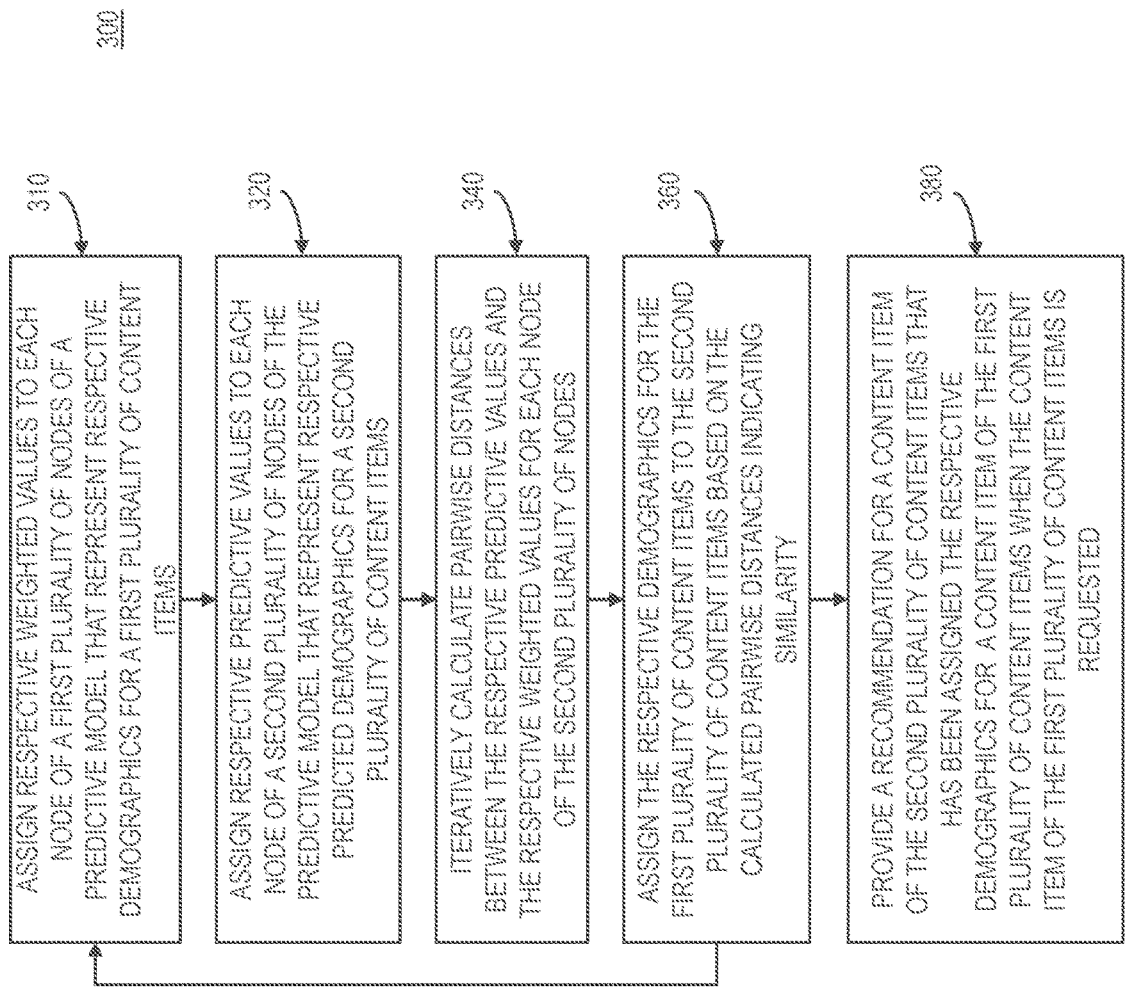
FIG. 3 illustrates a flowchart of an example method for demographic predictions for content items, according to some embodiments.

FIG. 3 shows a flowchart of an example method 300 for demographic predictions for content items, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2. However, method 300 is not limited to the aspects of those figures. A computer-based system (e.g., the multimedia environment 102, the system server(s) 126, etc.) may facilitate demographic predictions for content items.

In 310, to initialize a predictive model configured to demographic predictions for content items, system server(s) 126 assigns to each node of a first plurality of nodes of the predictive model for predicting demographic information for content items, a respective weighted value that represents a respective demographic for each content item of a first plurality of content items. According to some aspects of this disclosure, the predictive model may include, but is not limited to, an iterative KNN model and/or the like configured, as described herein, to provide predictions for content items. According to some aspects of this disclosure, each content item of the first plurality of content items may be content items associated with known demographic data/information. For example, some of the content items of the first plurality of content items may be animated movies, tv shows, cartoons, and/or the like associated with an age-based demographic of children ages 5-13 years old, and some of the content items of the first plurality of content items may include mature content-related movies, tv shows, and/or the like associated with an age-based demographic of adults over 21 years old. According to some aspects of this disclosure, the respective demographics for the first plurality of content items include, but are not limited to, age-related demographics, gender-related demographics, location-based demographics, ethnicity-based demographics, sexual orientation-based demographics, and/or the like. According to some aspects of this disclosure, each content item of the first plurality of content items may be content items associated with any known demographic data/information.

In 320, system server(s) 126 assigns to each node of a second plurality of nodes of the predictive model, a respective predictive value that represents a respective predicted demographic for each content item of a second plurality of content items. According to some aspects of this disclosure, each content item of the second plurality of content items may be content items associated with unknown demographic data/information. In other words, each content item of the second plurality of content items may be content items that must be classified with and/or assigned demographic data/information so that they may be recommended to users and/or user devices that request content items of the first plurality of content items.

In 340, for each node of the second plurality of nodes of the predictive model, system server(s) 126 calculates a pairwise distance (e.g., indicia of similarity, etc.) between the respective predictive value for the node and the respective weighted value for each node of the first plurality of nodes. According to some aspects of this disclosure, for each node of the second plurality of nodes, system server(s) 126 may calculate the pairwise distance between the respective predictive value for the node and the respective weighted value for each node of the first plurality of nodes based on calculations including, but not limited to, Euclidean distance calculations, Chebyshev distance calculations, cosine similarity calculations, Manhattan distance calculations, and/or the like.

In 360, for each node of the second plurality of nodes of the predictive model, system server(s) 126 assigns the respective demographic for a content item of the first plurality of content items to the respective content item of the second plurality of content items. According to some aspects of this disclosure, the assignment may be based on a calculated similarity between the content items. For example, for each node of the second plurality of nodes of the predictive model, system server(s) 126 assigns the respective demographic for a content item of the first plurality of content items to the respective content item of the second plurality of content items based on the pairwise distance between the respective predictive value for the node and the respective weighted value for a node of the first plurality of nodes being the shortest calculated pairwise distance. According to some aspects of this disclosure, steps 310-360 of method 300 may be performed iteratively, for example, for K iterations (e.g., where K denotes the number of node clusters for the predictive model) and/or until demographics converge for content items.

In 380, system server(s) 126 provides a recommendation for a content item of the second plurality of content items to a user device. According to some aspects of this disclosure, system server(s) 126 provides the recommendation for the content item of the second plurality of content items to the user device based on a request from a user device for another content item of the first plurality of content items and the respective demographic for the another content item being assigned to a content item of the second plurality of content items. In other words, system server(s) 126 may cause recommended content item (e.g., the content item of the second plurality of content items, an animated movie, etc.) to the user device that has been assigned the same demographic (e.g., audience age=12 years old, etc.) as a content item (e.g., an animated movie, etc.) requested by the user device. For example, if a user device requests an animated movie, tv show, cartoon, and/or the like associated with an age-based demographic of children ages 5-13 years old from the first plurality of content items, system server(s) 126 the predictive model may cause a recommendation for an animated movie, tv show, cartoon, and/or the like associated with an age-based demographic of children ages 5-13 years old from the second plurality of content items determined to be similar to the content item of the first plurality of content items by the predictive model.

According to some aspects of this disclosure, the recommendation for the content item of the second plurality of content items is displayed via a user interface of the user device. According to some aspects of this disclosure, the recommendation for the content item of the second plurality of content items includes, but is not limited to, a multimedia representation of the content item of the second plurality of content items, an image indicative of the content item of the second plurality of content items, a textual indication of the content item of the second plurality of content items, and/or the like.

According to some aspects of this disclosure, method 300 may further include system server(s) 126 identifying the respective weighted value for each node of the first plurality of nodes based on demographic information extracted from a plurality of user accounts that enable access to the first plurality of content items.

According to some aspects of this disclosure, method 300 may further include system server(s) 126 receiving, from another predictive model, based on respective attributes of each content item of the first plurality of content items input to the another predictive model, the respective demographic for each content item of the first plurality of content items. According to some aspects of this disclosure, system server(s) 126 determines the respective weighted value for each node of the first plurality of nodes of the predictive model based on the respective demographic for each content item of the first plurality of content items.

Example Computer System

Figure 4:
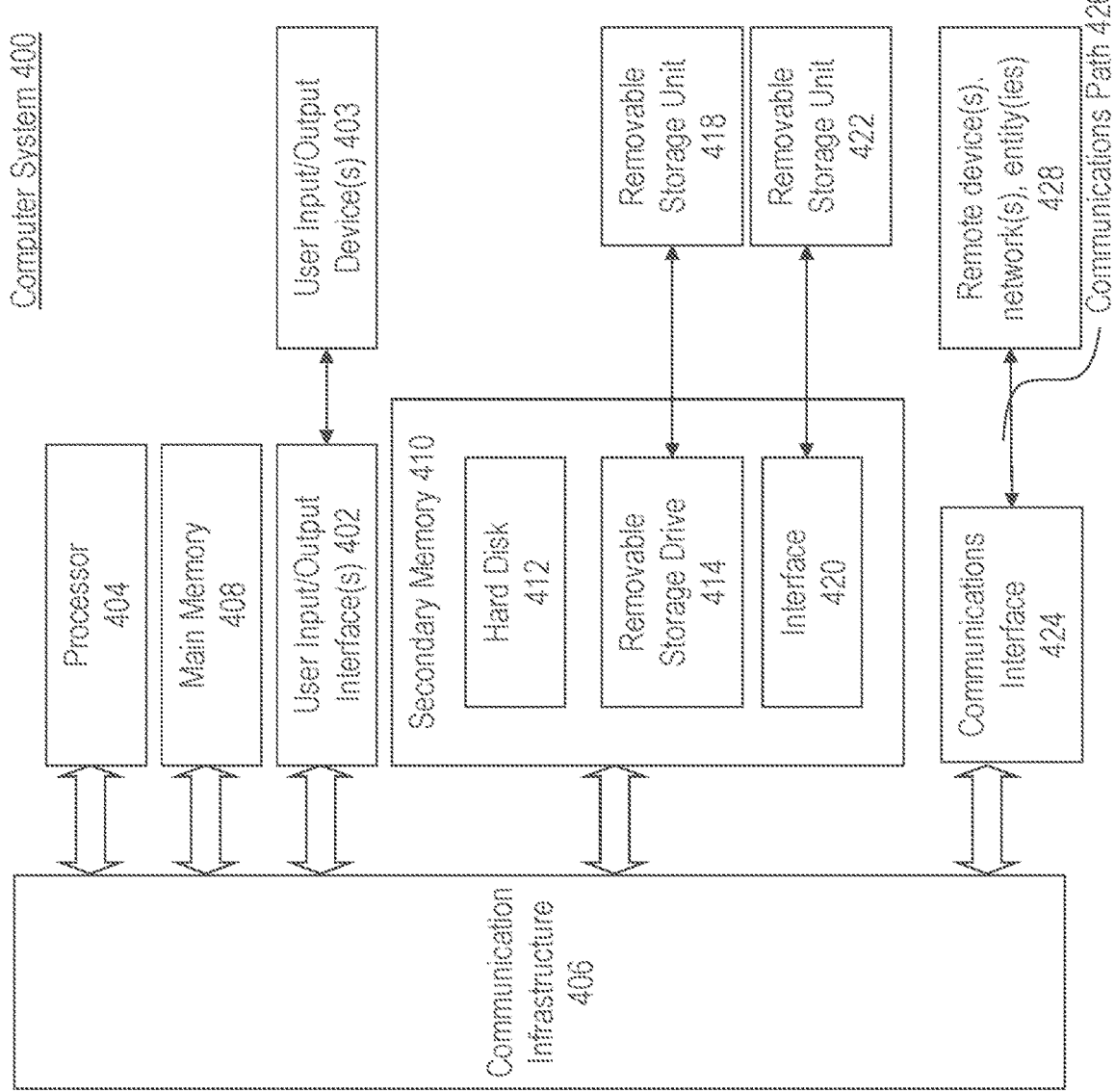
FIG. 4 illustrates an example computer system useful for implementing various embodiments.

Various embodiments may be implemented, for example, using one or more well-known computer systems, such as computer system 400 shown in FIG. 4. For example, the media device 106 and/or system server(s) 126 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions): "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for generating a predictive model for predicting demographic information for content items, comprising:

assigning, by at least one computer processor, to each node of a first plurality of nodes of a predictive model, a respective weighted value that represents a respective demographic for each content item of a first plurality of content items;

assigning, to each node of a second plurality of nodes of the predictive model, a respective predictive value that represents a respective predicted demographic for each content item of a second plurality of content items;

for each node of the second plurality of nodes:
  calculating a pairwise distance between the respective predictive value for the node and the respective weighted value for each node of the first plurality of nodes; and
  assigning, based on the pairwise distance between the respective predictive value for the node and the respective weighted value for a node of the first plurality of nodes being a shortest calculated pairwise distance, the respective demographic for a content item of the first plurality of content items to the respective content item of the second plurality of content items; and providing, based on a request from a user device for another content item of the first plurality of content items and the respective demographic for the another content item being assigned to a content item of the second plurality of content items, a recommendation for the content item of the second plurality of content items to the user device.

2. The computer-implemented method of claim 1, wherein the respective demographics for the first plurality of content items comprise at least one of: age-related demographics, gender-related demographics, location-based demographics, ethnicity-based demographics, or sexual orientation-based demographics.

3. The computer-implemented method of claim 1, wherein, for each node of the second plurality of nodes, the calculating the pairwise distance between the respective predictive value for the node and the respective weighted value for each node of the first plurality of nodes comprises at least one of a Euclidean distance calculation, a Chebyshev distance calculation, a cosine similarity calculation, or a Manhattan distance calculation.

4. The computer-implemented method of claim 1, further comprising identifying, based on demographic information extracted from a plurality of user accounts that enable access to the first plurality of content items, the respective weighted value for each node of the first plurality of nodes.

5. The computer-implemented method of claim 1, further comprising:
receiving, from another predictive model, based on respective attributes of each content item of the first plurality of content items input to the another predictive model, the respective demographic for each content item of the first plurality of content items; and
determining, based on the respective demographic for each content item of the first plurality of content items, the respective weighted value for each node of the first plurality of nodes of the predictive model.

6. The computer-implemented method of claim 1, further comprising:
identifying, based on a type of content indicated by the first plurality of content items and demographic information that maps types of content to demographics, the respective demographic for each content item of the first plurality of content items; and
determining, based on the respective demographic for each content item of the first plurality of content items, the respective weighted value for each node of the first plurality of nodes.

7. The computer-implemented method of claim 1, wherein the recommendation for the content item of the second plurality of content items is displayed via a user interface of the user device and comprises at least one of a multimedia representation of the content item of the second plurality of content items, an image indicative of the content item of the second plurality of content items, or a textual indication of the content item of the second plurality of content items.

8. A system for generating a predictive model for predicting demographic information for content items, the system comprising:
at least one processor configured to perform operations comprising:
assigning, to each node of a first plurality of nodes of a predictive model, a respective weighted value that represents a respective demographic for each content item of a first plurality of content items;
assigning, to each node of a second plurality of nodes of the predictive model, a respective predictive value that represents a respective predicted demographic for each content item of a second plurality of content items;
for each node of the second plurality of nodes:
calculating a pairwise distance between the respective predictive value for the node and the respective weighted value for each node of the first plurality of nodes; and
assigning, based on the pairwise distance between the respective predictive value for the node and the respective weighted value for a node of the first plurality of nodes being a shortest calculated pairwise distance, the respective demographic for a content item of the first plurality of content items to the respective content item of the second plurality of content items; and
providing, based on a request from a user device for another content item of the first plurality of content items and the respective demographic for the another content item being assigned to a content item of the second plurality of content items, a recommendation for the content item of the second plurality of content items to the user device.

9. The system of claim 8, wherein the respective demographics for the first plurality of content items comprise at least one of: age-related demographics, gender-related demographics, location-based demographics, ethnicity-based demographics, or sexual orientation-based demographics.

10. The system of claim 8, wherein, for each node of the second plurality of nodes, the calculating the pairwise distance between the respective predictive value for the node and the respective weighted value for each node of the first plurality of nodes comprises at least one of a Euclidean distance calculation, a Chebyshev distance calculation, a cosine similarity calculation, or a Manhattan distance calculation.

11. The system of claim 8, the operations further comprising identifying, based on demographic information extracted from a plurality of user accounts that enable access to the first plurality of content items, the respective weighted value for each node of the first plurality of nodes.

12. The system of claim 8, the operations further comprising:
receiving, from another predictive model, based on respective attributes of each content item of the first plurality of content items input to the another predictive model, the respective demographic for each content item of the first plurality of content items; and
determining, based on the respective demographic for each content item of the first plurality of content items, the respective weighted value for each node of the first plurality of nodes of the predictive model.

13. The system of claim 8, the operations further comprising:
identifying, based on a type of content indicated by the first plurality of content items and demographic information that maps types of content to demographics, the respective demographic for each content item of the first plurality of content items; and determining, based on the respective demographic for each content item of the first plurality of content items, the respective weighted value for each node of the first plurality of nodes.

14. The system of claim 8, wherein the recommendation for the content item of the second plurality of content items is displayed via a user interface of the user device and comprises at least one of a multimedia representation of the content item of the second plurality of content items, an image indicative of the content item of the second plurality of content items, or a textual indication of the content item of the second plurality of content items.

15. A non-transitory computer-readable medium having instructions stored thereon that, when executed by at least one computing device, cause the at least one computing device to perform operations for generating a predictive model for predicting demographic information for content items, the operations comprising:

assigning, to each node of a first plurality of nodes of a predictive model, a respective weighted value that represents a respective demographic for each content item of a first plurality of content items;

assigning, to each node of a second plurality of nodes of the predictive model, a respective predictive value that represents a respective predicted demographic for each content item of a second plurality of content items;

for each node of the second plurality of nodes:
calculating a pairwise distance between the respective predictive value for the node and the respective weighted value for each node of the first plurality of nodes; and assigning, based on the pairwise distance between the respective predictive value for the node and the respective weighted value for a node of the first plurality of nodes being a shortest calculated pairwise distance, the respective demographic for a content item of the first plurality of content items to the respective content item of the second plurality of content items; and providing, based on a request from a user device for another content item of the first plurality of content items and the respective demographic for the another content item being assigned to a content item of the second plurality of content items, a recommendation for the content item of the second plurality of content items to the user device.

16. The non-transitory computer-readable medium of claim 15, wherein the respective demographics for the first plurality of content items comprise at least one of: age-related demographics, gender-related demographics, location-based demographics, ethnicity-based demographics, or sexual orientation-based demographics.

17. The non-transitory computer-readable medium of claim 15, wherein, for each node of the second plurality of nodes, the calculating the pairwise distance between the respective predictive value for the node and the respective weighted value for each node of the first plurality of nodes comprises at least one of a Euclidean distance calculation, a Chebyshev distance calculation, a cosine similarity calculation, or a Manhattan distance calculation.

18. The non-transitory computer-readable medium of claim 15, the operations further comprising identifying, based on demographic information extracted from a plurality of user accounts that enable access to the first plurality of content items, the respective weighted value for each node of the first plurality of nodes.

19. The non-transitory computer-readable medium of claim 15, the operations further comprising:

receiving, from another predictive model, based on respective attributes of each content item of the first plurality of content items input to the another predictive model, the respective demographic for each content item of the first plurality of content items; and determining, based on the respective demographic for each content item of the first plurality of content items, the respective weighted value for each node of the first plurality of nodes of the predictive model.

20. The non-transitory computer-readable medium of claim 15, the operations further comprising:

identifying, based on a type of content indicated by the first plurality of content items and demographic information that maps types of content to demographics, the respective demographic for each content item of the first plurality of content items; and determining, based on the respective demographic for each content item of the first plurality of content items, the respective weighted value for each node of the first plurality of nodes.

* * * * *

UNITED STATES PATENT AND TRADEMARK OFFICE
CERTIFICATE OF CORRECTION

| | | |
|---|---|---|
| PATENT NO. | : 12,155,878 B2 | Page 1 of 1 |
| APPLICATION NO. | : 18/076955 | |
| DATED | : November 26, 2024 | |
| INVENTOR(S) | : Aggarwal et al. | |

It is certified that error appears in the above-identified patent and that said Letters Patent is hereby corrected as shown below:

On the Title Page

Column 1, Item (72), in "Inventors", Line 2, delete "Burlimgame," and insert -- Burlingame, --, therefor.

Column 2, Item (57), under "Abstract", Line 15, delete "nodes" and insert -- to nodes --, therefor.

In the Specification

In Column 2, Line 20, delete "nodes" and insert -- to nodes --, therefor.

In Column 3, Line 38, delete "OGG" and insert -- OGG, --, therefor.

In Column 3, Line 44, delete "AVI, AVI," and insert -- AVI, --, therefor.

In Column 3, Line 51, delete "DVCPRO, DVCPRO," and insert -- DVCPRO, --, therefor.

In Column 4, Line 64, delete "user 134's" and insert -- user's 134 --, therefor.

In Column 7, Line 22, delete "descriptors)." and insert -- descriptors): --, therefor.

In Column 7, Line 42, delete "content," and insert -- $content_i$ --, therefor.

In Column 10, Line 43, delete "and/any" and insert -- and/or any --, therefor.

In Column 11, Line 16, delete "solutions):" and insert -- solutions); --, therefor.

Signed and Sealed this
Thirtieth Day of September, 2025

John A. Squires
*Director of the United States Patent and Trademark Office*